April 20, 1937.  J. NUTRY  2,078,013
BEVERAGE FORMING MEANS
Filed Nov. 19, 1935
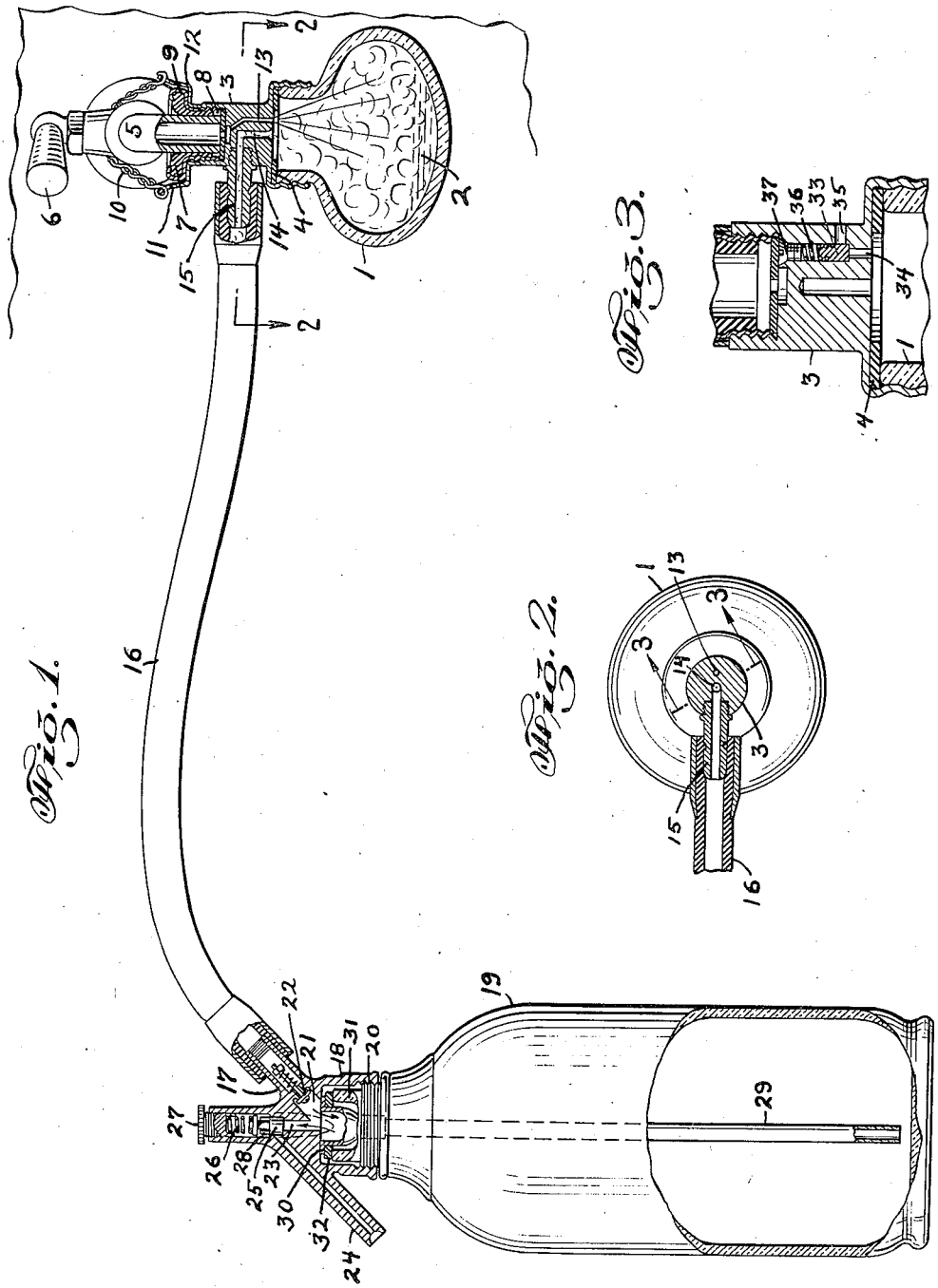
John Nutry INVENTOR
BY
Thomas Howe ATTORNEY Patented Apr. 20, 1937

2,078,013

UNITED STATES PATENT OFFICE 2,078,013

BEVERAGE FORMING MEANS

John Nutry, Brooklyn, N. Y.

Application November 19, 1935, Serial No. 50,509

3 Claims. (Cl. 225—21)

This invention relates to the preparation of beverages which involves the incorporation with a liquid, such as water, of any desired ingredient (which may be a single substance or a mixture of substances) such as flavoring or sweetening material, or both, and placing the prepared beverage under pressure whereby it may be ejected from its container with or without effervescence.

The main object of the invention is to utilize the force of a liquid under pressure which is to form a part of the beverage, to turbulate the liquid and ingredient together to form a thorough mixture and to place the mixture under pressure of a gas which is compressed by the pressure of said liquid.

A further object of the invention is to provide means for preparing a beverage of desired mixture and under pressure to expell it from its container, with the appurtenances ordinarily at hand in every household.

A further object of the invention is to provide means for preparing a beverage in the manner as described which may be operated from the usual water faucet connected with the usual pressure water supply main.

A further object of the invention is to provide means operable from the usual water faucet whereby the ultimate container for the beverage under pressure may be moved about or placed in any desired position with relation to the water faucet.

A further object of the invention is to provide a safety valve or valves at appropriate points in the apparatus to prevent excessive accummulation of pressure.

A further object of the invention is to provide a method of obtaining the liquid for a beverage from a source of liquid supply under pressure and utilizing the pressure of the liquid to turbulate together a beverage ingredient and the liquid and further utilizing the said liquid pressure to place the beverage mixture under suitable pressure whereby it may be expelled from its container.

Other and ancillary objects of the invention will appear hereinafter.

In the accompanying drawing, which illustrates the invention:

Fig. 1 is a side elevation, partly in section, of an apparatus embodying the invention and whereby the method may be carried out.

Fig. 2 is a section on the line 2—2 of Fig. 1, and

Fig. 3 is a section on the line 3—3 of Fig. 2.

Referring to the drawing, the apparatus comprises a mixing receptacle 1, preferably of glass, and having its bottom rounded so that any liquid jet forced into it from the top will be caused to swirl about and thoroughly mix with any ingredient contained therein without having its course impeded by corners or sharp angles between the walls. Within this receptacle may be placed a beverage ingredient 2. The ingredient may be a single substance, such as sugar or a flavor or it may be a mixture of substances, such as sugar and a flavoring substance.

To the mouth of the receptable, at its top, is screwed a metal closure 3, a gasket 4 of rubber or other suitable material being compressed between the upper edge of the neck of the receptacle and the closure and rendering the connection between the closure and the receptacle fluid tight.

The water from the beverage is obtained from the usual faucet 5 the connection of which with the usual water pressure supply mains is controlled by a handle 6.

To effect a fluid tight connection between the faucet and the closure 3 a rubber sleeve 7 is secured in a socket 8 of the closure by means of the metal casing 9 for the rubber which is screw threaded into the socket. The sleeve 7 is of such interior diameter that when the end of the faucet is inserted therein a fluid tight engagement will be formed. It may be that the frictional engagement of the end of the faucet with the closure may be sufficient to suspend the connected parts in position but in order to insure the securing of the faucet and closure in connected relation, even when the fluid pressure tending to force them apart is high, a chain 10 passes about the faucet and is secured at its ends to the ears 11 and 12 secured to the closure 3. Communicating with the interior of the socket 8 and with the interior of the faucet when it is in position within the socket, the closure has a restricted passage 13 through which the water under pressure from the faucet is conveyed to the interior of the closure 3 whence it is projected downwardly to a jet against the bottom of the receptacle 1 thereby turbulating the water and ingredient therein and thoroughly mixing the same. When the receptacle 1 has been filled with the liquid it, with the ingredient, will be forced by the pressure of the water main through the exit passage 14 and through the nipple 15 into the rubber tube 16, the other end of the tube 16 engaging in fluid tight relation the nipple 17 on the closure 18 of a bottle 19.

The metal closure 18 is screw threaded to the bottle 19 at 20. The closure has an inlet passage 21 controlled by an inwardly opening check valve 22 and also an outlet passage 23 adapted to be placed in communication with the passage of the nozzle 24, such communication being controlled by the plunger valve 25 pressed into closing position by means of the spring 26 confined by the adjusting cap 27. This valve may be raised to open communication with the nozzle by means of the fork end 28 of a suitable and well known form of pivoted finger operated lever.

A tube 29 has its lower end in close proximity to the bottom of the bottle 19 and at its upper end has a flange 30 which is clamped by the closure 18 against the upper end of a neck 31 on the bottle with a gasket 32 of rubber or other suitable material interposed so that a fluid tight joint is formed.

The liquid passing through the tube 16 which, being flexible, will permit the receptacle 19 to be placed in any desired position with relation to the faucet, will pass under the pressure of the water main into the bottle 19, the check valve 22 permitting passage into the bottle 19 but preventing backward flow therefrom. The beverage consisting of the water and ingredient added thereto will be forced by the water main pressure downwardly through the tube 29 and as the bottle 19 fills the air contained therein will be compressed in the upper portion of the bottle and pressure will thus be accumulated which will tend to eject the liquid outwardly through the tube 29. When the bottle 19 has been filled to the desired extent the tube 16 may be removed from the nipple 17 and the charged bottle 19 may be used at once or reserved for future use. When it is desired to use the beverage, the valve 25 may be lifted in the usual manner by means of a finger lever when the accumulated pressure of the compressed gas in the bottle 19 will force the beverage outwardly through the tube 29 and the nozzle 24. The liquid so ejected will, especially if there is considerable pressure, be mixed with the air so as to effervesce to some extent.

The spring adjusted valve 25 may also function as a safety valve for relieving undue pressure in the bottle at the proper point.

In order to relieve against undue accumulation of pressure in the receptacle 1, a safety valve may be provided in the closure 3. This valve may consist of the piston valve 33 controlling communication between the passage 34 opening into the receptacle 1 and the passage 35 opening into the atmosphere. The valve is pressed by the spring 36 confined by the adjusting screw 37, into position to close the communication between the passages 34 and 35 but upon the development of undue pressure within the receptacle the valve is raised against the spring and the excessive pressure is discharged into the atmosphere.

While the invention has been illustrated in what is considered its best application, it may be embodied in other structures without departing from its spirit and is not therefore limited to the structures shown in the drawing.

What I claim is:

1. In a means for preparing beverages, the combination with a receptacle for holding a beverage ingredient and mixing it with a liquid, of a closure for said receptacle having an inlet passage for liquid under pressure and an exit passage for the mixed liquid and ingredient also under pressure, said closure also having a socket into which said inlet passage opens adapted to receive the end of a pipe communicating with a source of liquid pressure.

2. In a means for preparing beverages, the combination with a receptacle for holding a beverage ingredient and mixing it with a liquid, of a closure for said receptacle having an inlet passage for liquid under pressure and an exit passage for the mixed liquid and ingredient also under pressure, said closure also having a socket into which said inlet passage opens adapted to receive the end of a faucet communicating with a source of liquid pressure, and means passing about said faucet for securing said receptacle thereto.

3. In a means for preparing beverages, the combination with a receptacle for holding a beverage ingredient and mixing it with a liquid, of a closure for said receptacle having a safety valve, an inlet passage for liquid under pressure and an exit passage for the mixed liquid and ingredient also under pressure, said closure also having a socket into which said inlet passage opens adapted to receive the end of a faucet communicating with a source of liquid pressure, and means passing about said faucet for securing said receptacle thereto.

JOHN NUTRY.